United States Patent [19]

Weinich

[11] 4,124,250
[45] Nov. 7, 1978

[54] MOTOR VEHICLE SEAT

[75] Inventor: Manfred Weinich, Gechingen, Germany

[73] Assignee: Daimler-Benz Aktiengesellschaft, Germany

[21] Appl. No.: 831,397

[22] Filed: Sep. 8, 1977

[30] Foreign Application Priority Data

Sep. 11, 1976 [DE] Fed. Rep. of Germany ....... 2640959

[51] Int. Cl.² ............................................. B60N 1/10
[52] U.S. Cl. ................................... 297/335; 297/379; 296/66
[58] Field of Search ....................... 297/335, 331, 379; 296/66, 69

[56] References Cited

U.S. PATENT DOCUMENTS

| | | | |
|---|---|---|---|
| 3,294,443 | 12/1966 | Beckman et al. | 297/379 X |
| 3,550,949 | 12/1970 | Bonnaud | 297/379 X |
| 3,727,976 | 4/1973 | Lystad | 296/66 |
| 3,746,389 | 7/1973 | Fourrey | 297/379 X |
| 3,973,799 | 8/1976 | Berg | 297/379 X |
| 4,008,919 | 2/1977 | Muraishi | 297/331 |

Primary Examiner—Francis K. Zugel
Attorney, Agent, or Firm—Craig & Antonelli

[57] ABSTRACT

A motor vehicle seat, especially a rear seat for a station wagon whose seat cushion is adapted to be folded about a fixed pivot shaft located near its lower forward edge and whose backrest is adapted to be folded about a fixed pivot shaft located near its lower edge in such a manner that these parts can be displaced out of the seating position into a position in which the back side of the backrest forms a horizontal loading surface which is delimited by the bottom side of the seat cushion as forward, vertical abutment surface; a shaft extending transversely to the driving direction is rotatably supported underneath the backrest and to the rear of the seat cushion whereby one lever each is non-rotatably arranged at the two ends of the shaft, which effect the seat cushion locking while a pivot arm is pivotally connected at the lever at a distance from the latter's pivot axis which, during actuation of the lever, is being disengaged from its detent.

7 Claims, 4 Drawing Figures

MOTOR VEHICLE SEAT

The present invention relates to a motor vehicle seat, especially to a rear seat for a station wagon motor vehicle whose seat cushion is adapted to be folded about a fixed pivot shaft located near its lower forward edge and whose backrest is adapted to be folded over about a fixed pivot shaft located near its lower edge in such a manner that these parts can be displaced out of the seating position into a position, in which the back side of the backrest forms a horizontal loading surface which is delimited by the bottom side of the seat cushion as vertical forward abutment surface, with one pivot arm each pivotally arranged on the two sides of the seat.

A large number of constructions for foldable motor vehicle seats of this type exist; however, these prior art motor vehicle seats are, for the most part, very expensive and complicated and include a complex, extensive linkage so that the latter is easily the cause for jamming. These prior art motor vehicle seats in many cases cannot be operated easily and also have to be specially locked, whereas, on the other hand, it requires an effort to displace the backrest and seat cushion into a position in which they free space for an increased loading space and form with their back sides the loading surface and the boundary thereof.

The present invention is concerned with the task to so construct a motor vehicle seat, especially a rear seat, for a station wagon that the seat backrest and a seat cushion are automatically locked in the seating position by a simple pivoting or tilting action. Additionally, the locking for the backrest and the seat cushion is to be released again simultaneously on both sides thereof by the actuation of a single lever within the boarding or ingress area, regardless from which side of the motor vehicle such actuation takes place, so that the seat can be folded over into an enlarged loading surface.

The underlying problems are solved according to the present invention in that a shaft is rotatably supported transversely to the driving direction underneath the backrest and behind the seat cushion, whereby one lever each is non-rotatably connected to the two ends of this shaft, which effects directly or indirectly the seat cushion locking while the pivot arm is pivotally connected at the respective lever at a distance from the latter's pivot axis, which pivot arm is being pulled out of a catch upon actuation of the lever.

In order that both the pivot arm as also the lever can be displaced easily into the detent or locking positions thereof, according to a further advantageous feature of the present invention, springs are advantageously arranged at the lever and at the pivot arm which rotate back and pull back the lever and the pivot arm into their normal initial position.

In order that the seat cushion can also lock alone, when being folded back, without once more releasing the locking or latching mechanism of the backrest, a detent or latching member may additionally be rotatably arrange on the shaft which is pressed by a further spring against an abutment at the lever.

Accordingly, it is an object of the present invention to provide a vehicle seat, especially a back seat, for a station wagon which avoids by simple means the the aforementioned shortcomings and drawbacks encountered in the prior art by extremely simple means.

Another object of the present invention resides in motor vehicle seats, especially back seats for station wagons which involve a relatively simple, yet highly reliable construction with relatively few, inexpensive parts.

A further object of the present invention resides in a motor vehicle seat, especially a back seat for a station wagon in which malfunction due to jamming of linkage parts is effectively avoided.

Still another object of the present invention resides in a motor vehicle rear seat of the type described above which can be easily operated without great efforts.

Another object of the present invention resides in a motor vehicle seat, especially in a rear seat for a station wagon, in which the backrest and seat cushion are automatically locked in the seating position by a simple tilting movement.

A further object of the present invention resides in a motor vehicle seat of the type described above in which the unlatching or unlocking of the backrest and seat cushion can be realized from each side of the vehicle by the actuation of only a single lever regardless of the vehicle side from which the actuation takes place.

These and further objects, features and advantages of the present invention will become more apparent from the following description when taken in connection with the accompanying drawing which shows, for purposes of illustration only, two embodiments in accordance with the present invention and, wherein.

Figure 1:
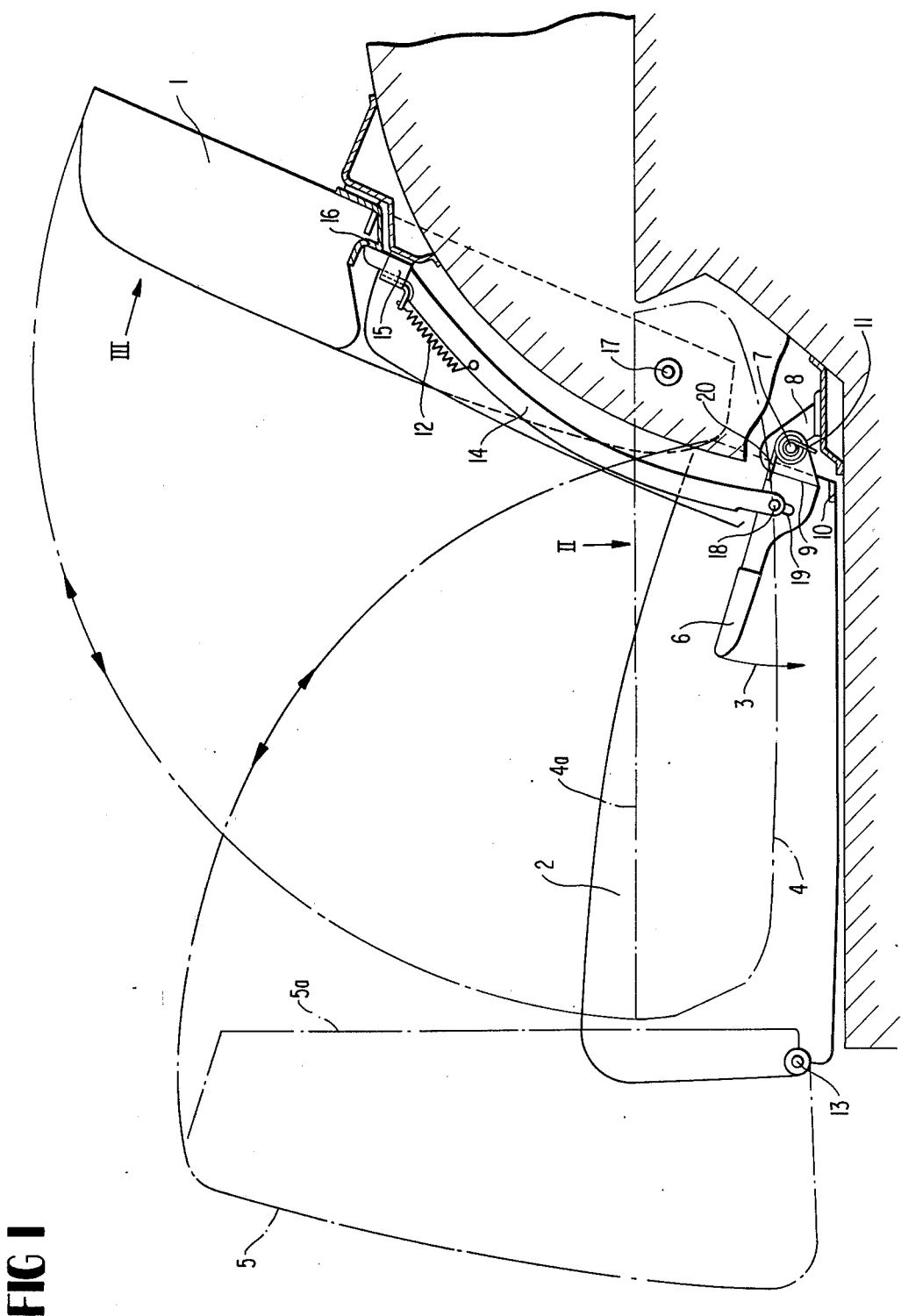
FIG. 1 is a schematic side elevational view of a motor vehicle seat according to the present invention.

Referring now to the drawing wherein like reference numerals are used throughout the various views to designate like parts, and more particularly to FIG. 1, in this figure the backrest 1 and the seat cushion 2 are illustrated in full lines in the latched or locked seating position; the position 4 of the backrest and the position 5 of the seat cushion are illustrated in dash and dot lines in FIG. 1, in which they are so folded over that the back side 4a of the backrest 4 forms a horizontal loading surface and the backrest 5a of the seat cushion 5 forms a vertical boundary surface with respect to the loading surface 4a.

Figure 2:
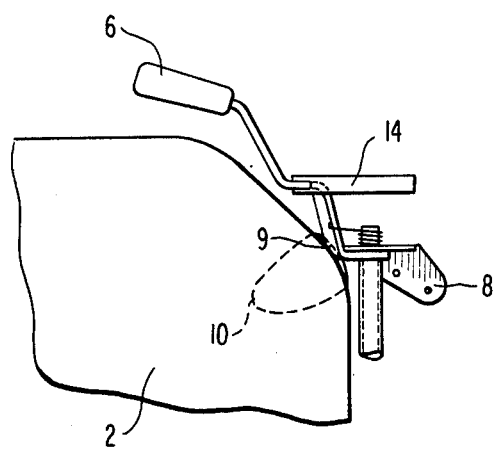
FIG. 2 is a partial schematic plan view taken in the direction of arrow II of FIG. 1 on a seat cushion part according to the present invention with a detent mechanism on one side of the seat.
Figure 3:
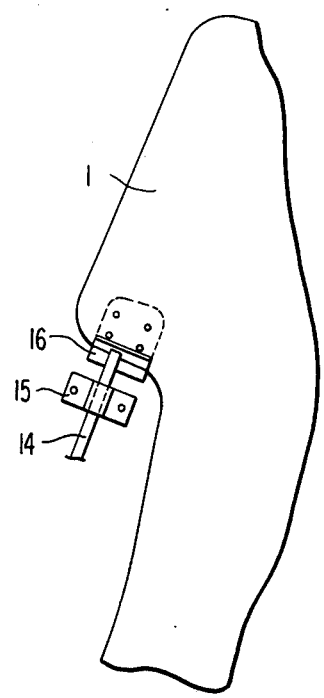
FIG. 3 is a schematic partial elevational view, taken in the direction of arrow III of FIG. 1, on a part of a backrest with a detent mechanism for one side of the backrest.

A shaft 7 extending transversely to the driving direction is rotatably supported underneath the backrest 1 and to the rear of the seat cushion 2 with the aid of a bearing support 8 secured at the vehicle body. One lever 6 each is non-rotatably connected with the shaft 7 on the two ends thereof, which takes care directly or indirectly of the locking of the seat cushion 2; one pivot arm 14 each is pivotally connected on a respective lever 6 at a distance from the latter's pivot axis. As can be seen from FIG. 2, the lever 6 is cranked. It engages with its corner 9 resulting from the cranking, behind a plate 10 and assures thereby the seating position of the seat cushion 2 against an undesired forward folding or tilting. A coil spring 11 engages at the lever 6 which seeks to rotate and thereby holds the lever 6 in the locking position illustrated in FIG. 1. A draw coil spring 12 engages at the pivot arm 14 and also holds the latter in its locking position. In this locking position, the pivot arm 14 which is longitudinally displaceably guided in a guide plate 15, engages a detent catch 16 from behind.

In order that the seat cushion 2 and the backrest 1 can now be tilted or folded forwardly, they are pivotally supported about a pivot shaft 13 and a pivot shaft 17, respectively.

If the seat cushion 2 and the backrest 1 are now to be folded or tilted forwardly, then only one lever 6 on side of the vehicle has to be actuated in order that both the locking means of the seat cushion 2 as also of the backrest 1 are released.

During the disengagement, the respective lever 6 on one side of the motor vehicle seat is pivoted in the direction of arrow 3 about the shaft 7 of the bearing support 8 secured at the body. During the pivoting, the corner 9 of the lever 6 releases the plate 10 at the seat cushion 2 so that the latter can be folded or tilted forwardly about the pivot shaft 13 into the position indicated in FIG. 1 in dash and dot lines and designated be reference numeral 5, in which the back side 5a of the seat cushion forms a vertical boundary surface with respect to the horizontal loading surface 4a. Simultaneously therewith, the pivot arm 14 is pulled downwardly by the actuation of the lever 6 in the direction of the arrow 3 so that its free end releases the detent or locking catch 16. As a result thereof, also the backrest 1 can be displaced forwardly about the pivot shaft 17 into the position 4 illustrated in dash and dot lines in FIG. 1, in which the back side 4a of the backrest forms a horizontal loading surface.

By reason of the fact that one lever 6 each is arranged on each side of the shaft 7, it is immaterial from which side of the vehicle the locking or latching is released since the locking or detent mechanisms on both sides of the vehicle are connected with each other by the shaft 7 and therefore operate synchronously with each other.

The locking or latching of the backrest takes place by tilting or folding it back into the position 1. When pivoting back the backrest, the inclined abutment surface located at the detent catch 16 forces the end of the pivot arm 14 in the downward direction against the resistance of the spring 12. In order that the backrest 1 can engage easily and independently on the right or the left side, an elongated aperture 19 is provided at the lever 6, in which slides a bolt 18 that is secured at the pivot arm 14. When reaching the seating position 1 provided for the backrest, the draw coil spring 12 brings about that the free end of the pivot arm 14 engages in the detent catch 16 and therewith locks the backrest.

If now also the seat cushion is additionally folded or tilted into the seating position, then the plate 10 presses the lever 6 downwardly at the sliding edge 9 about the axis of the shaft 7. If the seating position is reached, the lever 6 is pivoted back by the spring 11 up to an abutment 20. The seat cushion 2 is then secured against a folding or tilting back in the forward direction.

Figure 4:
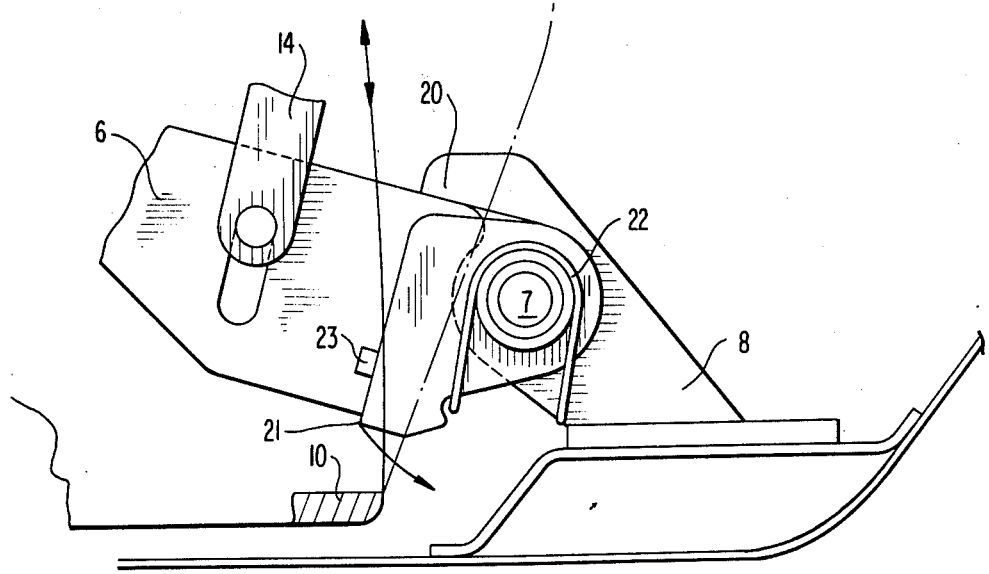
FIG. 4 is a partial schematic side elevational view of a modified embodiment of a motor vehicle seat in accordance with the present invention, illustrating a part with an additional detent member at the lever.

If during the detent or locking operation of the seat cushion 2, the lever 6 and the pivot arm 14 are not to be displaced or moved, this can be effected by an additional detent member 21 illustrated in FIG. 4. This detent member 21 is pivotally arranged on the shaft 7 and is forced by a further spring 22 against an abutment 23 at the lever 6.

The arrangement of the present invention can be used for separate, individual seats or for a seat bench with the same, non-modified construction.

While I have shown and described only two embodiments in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A motor vehicle seat, comprising seat cushion means operable to be pivoted about a fixed pivot shaft located near its lower forward edge and a backrest means with detent means thereon operable to be pivoted about a fixed pivot shaft located near its lower edge, said seat cushion means and said backrest means being operable to be so displaced out of the seating position thereof into a position in which the back side of the backrest means forms a substantially horizontal loading surface which is delimited by the bottom side of the seat cushion means as substantially vertical forward abutment surface, and one pivot arm means on each side of the motor vehicle seat, characterized in that a shaft extending substantially transversely to the vehicle driving direction is rotatably supported in the vehicle underneath the backrest means and to the rear of the seat cushion means, one lever means being non-rotatably arranged on each of the two ends of said shaft said lever means being operable to effect the seat cushion locking, and said pivot arm means being pivotally connected with the lever means at a distance from the axis of rotation of said shaft, said pivot arm means being disengaged out of said detent means during actuation of the lever means.

2. A motor vehicle seat according to claim 1, characterized in that the detent means is a detent catch and the pivot arm means is being pulled out of the detent catch during actuation of the lever means.

3. A motor vehicle seat according to claim 2, characterized in that spring means engage at the lever means and at the pivot arm means, which seek to rotate and pull back the lever means and pivot arm means into their initial position, respectively.

4. A motor vehicle seat according to claim 3 characterized in that an additional detent member is rotatably arranged on said shaft which is being forced by a further spring means against an abutment provided at the lever means.

5. A motor vehicle seat according to claim 1, characterized in that spring means engage at the lever means and at the pivot arm means, which seek to rotate and pull back the lever means and pivot arm means into their initial position, respectively.

6. A motor vehicle seat according to claim 5, characterized in that an additional detent member is rotatably arranged on said shaft which is being forced by a further spring means against an abutment provided at the lever means.

7. A motor vehicle seat according to claim 1, characterized in that an additional detent member is rotatably arranged on said shaft which is being forced by a spring means against an abutment provided at the lever means.

* * * * *